(12) United States Patent
Huang

(10) Patent No.: US 9,945,514 B1
(45) Date of Patent: Apr. 17, 2018

(54) FAST TUBE-ATTACHABLE FRAME

(71) Applicant: Pei-Hsiu Huang, New Taipei (TW)

(72) Inventor: Pei-Hsiu Huang, New Taipei (TW)

( * ) Notice: Subject to any disclaimer, the term of this patent is extended or adjusted under 35 U.S.C. 154(b) by 0 days.

(21) Appl. No.: 15/586,250

(22) Filed: May 3, 2017

(51) Int. Cl.
*F16B 2/02* (2006.01)
*F16M 13/02* (2006.01)
*F16B 2/10* (2006.01)

(52) U.S. Cl.
CPC ............ *F16M 13/022* (2013.01); *F16B 2/02* (2013.01); *F16B 2/10* (2013.01)

(58) Field of Classification Search
CPC .... F16M 13/022; F16M 13/02; F16M 11/041; F16M 11/043; F16M 11/10; F16M 11/28; F16M 11/04; F16M 11/14; F16M 2200/061; A16B 2/10; A16B 2/12; A16B 2/02; A16B 2/00
USPC ... 248/230.4, 683, 351, 354.1, 354.3, 230.6, 248/228.6, 231.71, 231.61, 230.5, 228.5, 248/229.24, 229.25, 229.15, 229.14
See application file for complete search history.

(56) References Cited

U.S. PATENT DOCUMENTS

| | | | | |
|---|---|---|---|---|
| 8,085,481 B2 * | 12/2011 | Hill | ........................ | G03B 3/00 248/229.24 |
| 8,864,000 B2 * | 10/2014 | Meyer | ................. | B60R 11/0235 224/275 |
| 9,115,740 B2 * | 8/2015 | Chang | .................. | F16M 11/041 |
| 9,144,160 B2 * | 9/2015 | Chuang | ................. | F16M 11/14 |
| 9,206,943 B2 * | 12/2015 | Chang | ...................... | A45B 3/00 |
| 9,273,821 B2 * | 3/2016 | Chang | .................... | F16M 13/00 |
| 9,664,214 B1 * | 5/2017 | Gupta | ....................... | F16B 2/10 |
| 2008/0099645 A1 * | 5/2008 | Reichley | ................. | B60R 11/00 248/285.1 |
| 2017/0051871 A1 * | 2/2017 | Brzezicki | ................. | B25B 7/04 |

* cited by examiner

Primary Examiner — Nkeisha Smith
(74) Attorney, Agent, or Firm — Leong C. Lei

(57) ABSTRACT

Disclosed is a fast tube-attachable frame, which generally includes, in structure, a clamp body that includes a first clamping member, a second clamping member, and a tightness adjustment assembly; a connection section; two clamping sections; at least one tenon section; a clamping cutout section, at least one position-constraining threaded hole, a position-constraining screw, and a coupling assembly. With the above structural arrangement, by means of clamping members that are integrally formed and mutual jointing of the tenon sections, the structural strength and clamping force of the clamp body are improved. The position-constraining screw and the position-constraining threaded hole function to maintain a spacing distance of the clamping sections and increase the strength of the second clamping member.

7 Claims, 10 Drawing Sheets

FAST TUBE-ATTACHABLE FRAME

(a) TECHNICAL FIELD OF THE INVENTION

The present invention relates generally to a fast tube-attachable frame, and more particularly to a fast tube-attachable frame that comprises a clamp having a high structural strength and providing a strong clamping force and makes use of a position-constraining threaded hole to maintain the strength and functionality of the clamps and is operable without use of any tool, allowing for fast mounting/removal and showing excellent convenience of use.

(b) DESCRIPTION OF THE PRIOR ART

Most of the tube clamps that are currently available make use of a spring force of an elastic element or fastening means to achieve secured fixation. For tube clamps that apply fastening means to get fixed, the tube clamps are inevitably compressed by a fastening element in order to press against a tubular object to which the clamp is attached, and also, the tube clamp has inevitably to receive a reactive force from the tubular object. This undesirably causes deformation or even breaking at a curved or bent portion of the tube clamp and consequently, the tube clamp may get detached and falling, or even gets severely damaged and become inoperable. Increasing the size, such as thickness, of the clamp tube or making the clamp tube through an integral formation process may be applied to overcome such a structural strength issue; however, the nature of the clamp tube for being operable to attach to an external member makes the structure complicated and this makes such solutions difficult for manufacturing.

In addition to the stress issue occurring in the tube clamp during a clamping operation, it is also often necessary to attach or mount a bar or a frame to the tube clamp in order to upgrade the functionality of the tube clamp. In making such attachment or mounting, it often becomes a challenge to the structural strength of the tube clamp. This is because, for regular tube clamps, strength improvement is often made around a clamping opening, while the bar or frame is generally attached or mounted to the tube clamp at a location different from the clamping opening. It is often that, at the time when the attaching or mounting is carried out, the tube clamp is susceptible to warping or deformation at the site where the attachment or mounting is done. In addition, the part of the tube clamp to which the bar or frame is attached is generally provided with one or two holes only for fastening with bolts and nuts. Such a fastening operation often makes the tube clamp deformed, leading to instability of the tube or frame.

SUMMARY OF THE INVENTION

The primary objective of the present invention is that through steel plate pressing and bending and mutual jointing of tenons, clamping members having two ends showing opposite U-shapes are formed in order to improve structural strength and clamping force of a clamp body; and in addition, at a coupling site between a rod (position-constraining screw) and the clamp body (position-constraining threaded hole), the thread is used to provide positional constraint in upward and downward direction so as to ensure the strength and functionality of the clamp body.

The present invention provides a structure that comprises: a clamp body, which is in the form of an X-shape. The clamp body comprises a first clamping member and a second clamping member that are mutually extending into each other and rotatably coupled to each other, and a tightness adjustment assembly movably arranged at one side of the first clamping member. The first and clamping member and the second clamping member are respectively formed with a connection section. Two opposite sides of the connection section are each formed with a clamping section extending therewith. The clamping sections are respectively formed with at least one tenon section for mutual jointing with each other to improve structural strength. Each of the clamping sections is formed with a clamping cutout section. At least one position-constraining threaded hole is formed in the two clamping sections for maintain a spacing distance between the two clamping sections and increasing the structural strength of the clamp body. The clamp body is provided with a position-constraining screw that corresponds to and couples with the position-constraining threaded hole. The position-constraining screw is provided, at an end thereof that is distant from the position-constraining threaded hole, with a coupling assembly for coupling with a member-to-be-held. When a user uses the present invention for clamping to a tubular or rod-like object, the two clamping sections are simultaneously operated for clamping with the clamping cutout section enclosing the tubular or rod-like object to thereby making the clamp body securely fixed to the tubular or rod-like object. The mutual jointing of the tenon sections helps further improve structural strength to effectively support and resist a fastening and fixing operation conducted with the tightness adjustment assembly. Further, the connection between the position-constraining screw and the position-constraining threaded hole, and the coupling assembly provided on the position-constraining screw, provide diverse ways of application of the clamp. The thread of the position-constraining threaded hole can be used to constrain a relative position of the clamping sections in order to increase the structural strength of clamping sections and thus prevent an operation of fastening and fixing from affecting the structural strength or outer appearance of the clamping sections.

With above-described techniques, the drawbacks of the prior art tube clamp that the clamping force is insufficient, the durability of the clamp is poor, a tool must be involved in fastening, and additionally mounting a functional element to the clamp leads to susceptible damage of the clamp structure can be overcome to thereby achieve the advantages discussed above.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

Figure 1:
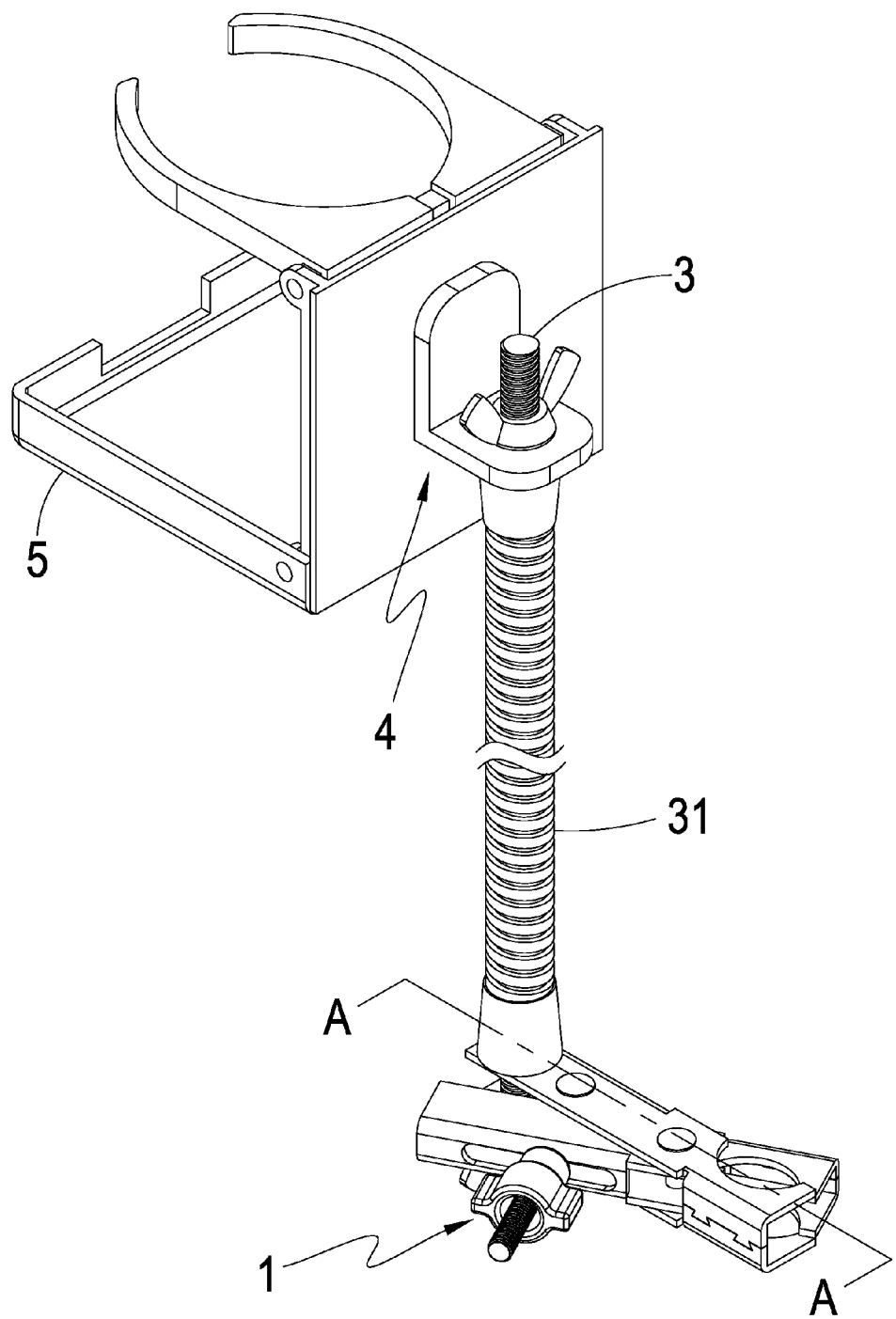
FIG. 1 is a perspective view showing a preferred embodiment of the present invention.
Figure 2:
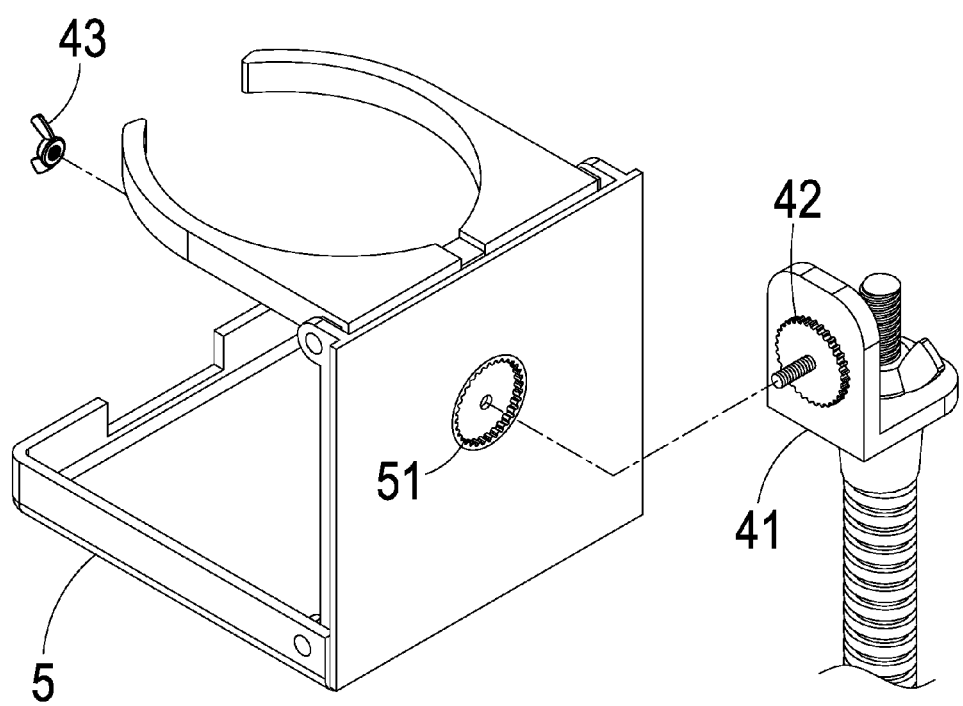
FIG. 2 is an exploded view showing the preferred embodiment according to the present invention.
Figure 3:
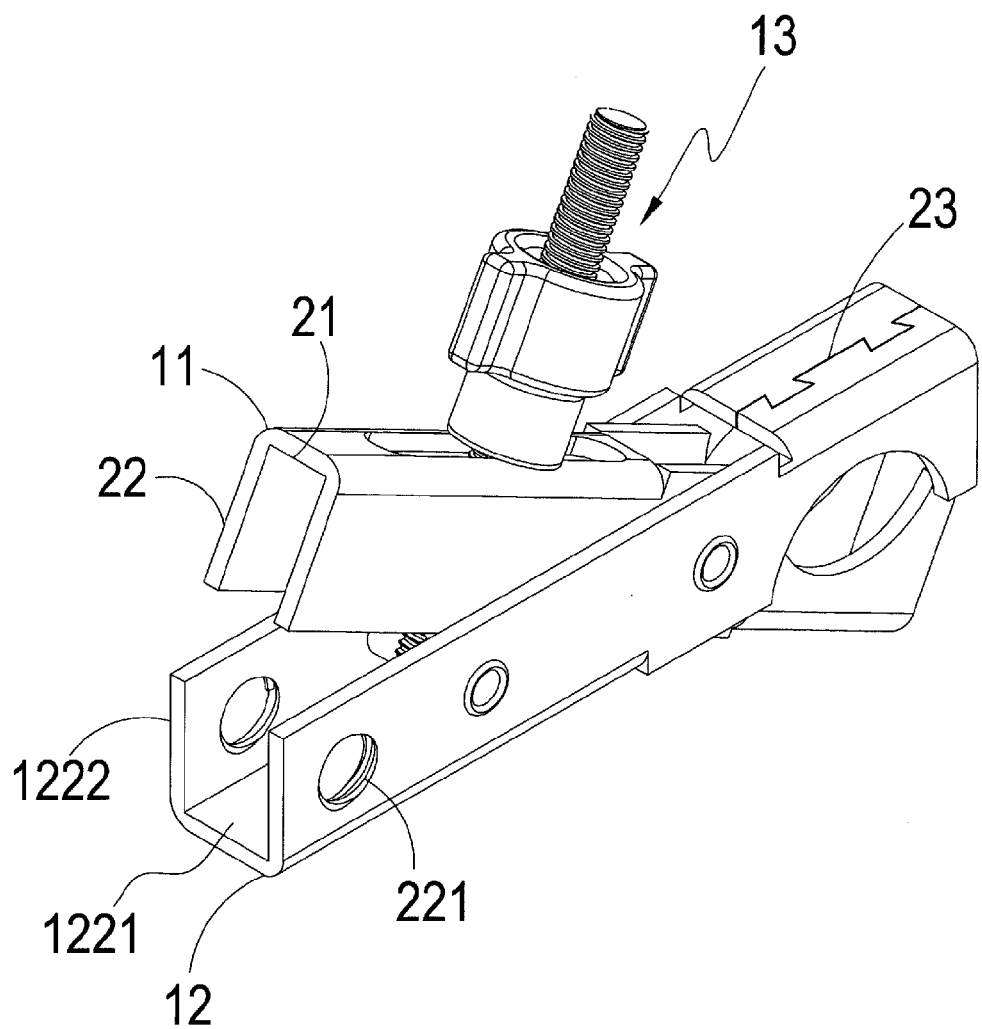
FIG. 3 is a perspective view showing a clamp body according to the present invention.
Figure 4:
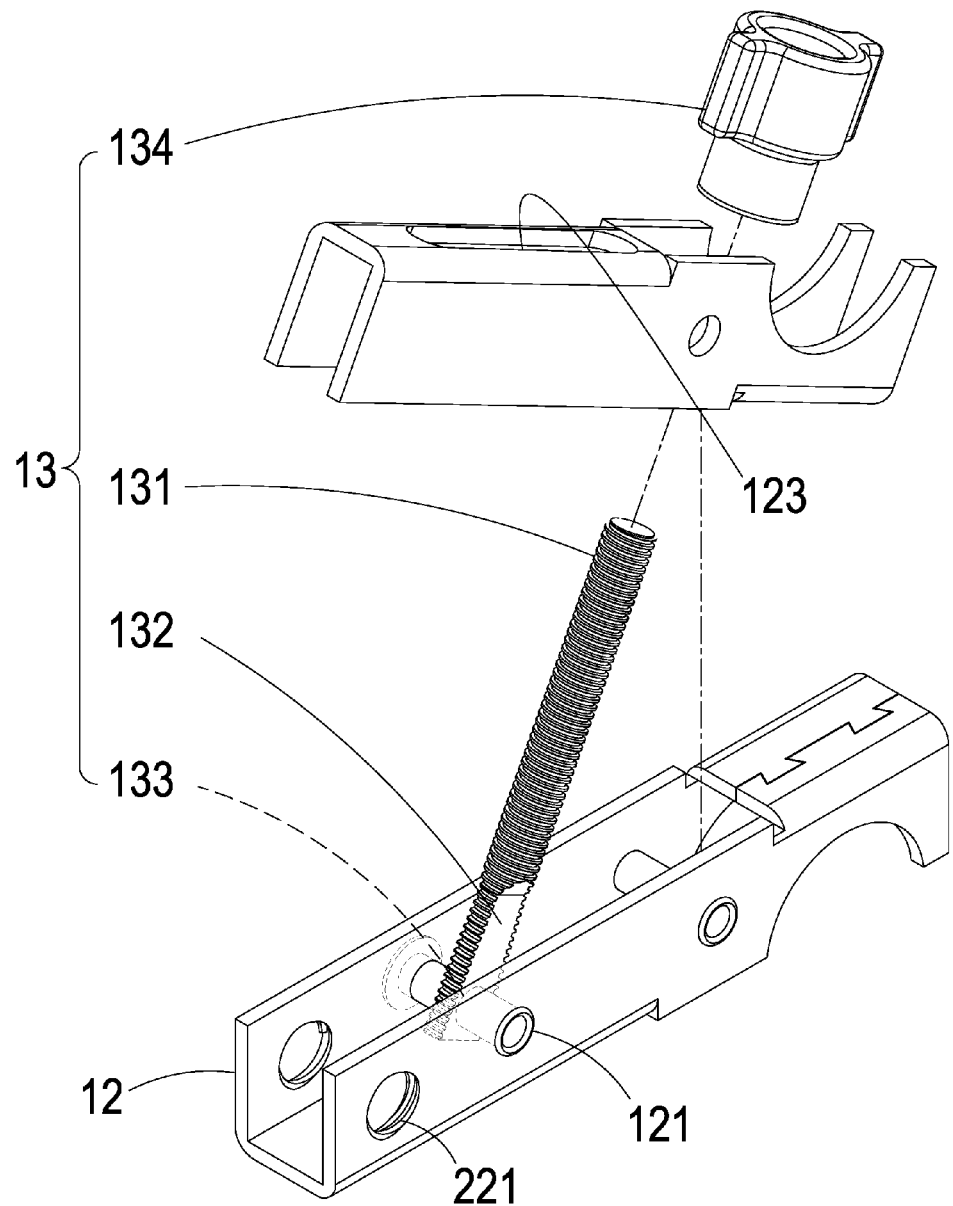
FIG. 4 is an exploded view showing a clamp body according to the present invention.
Figure 5:
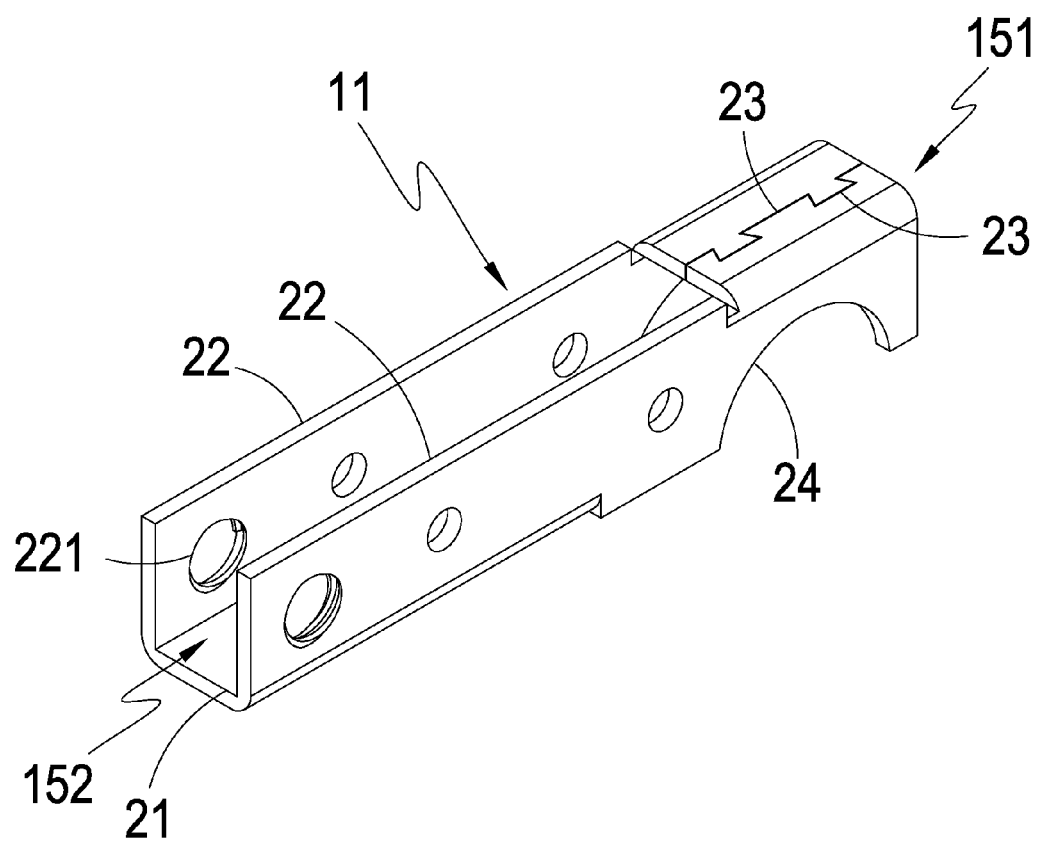
FIG. 5 is a perspective view showing a clamping member according to the present invention.
Figure 6:
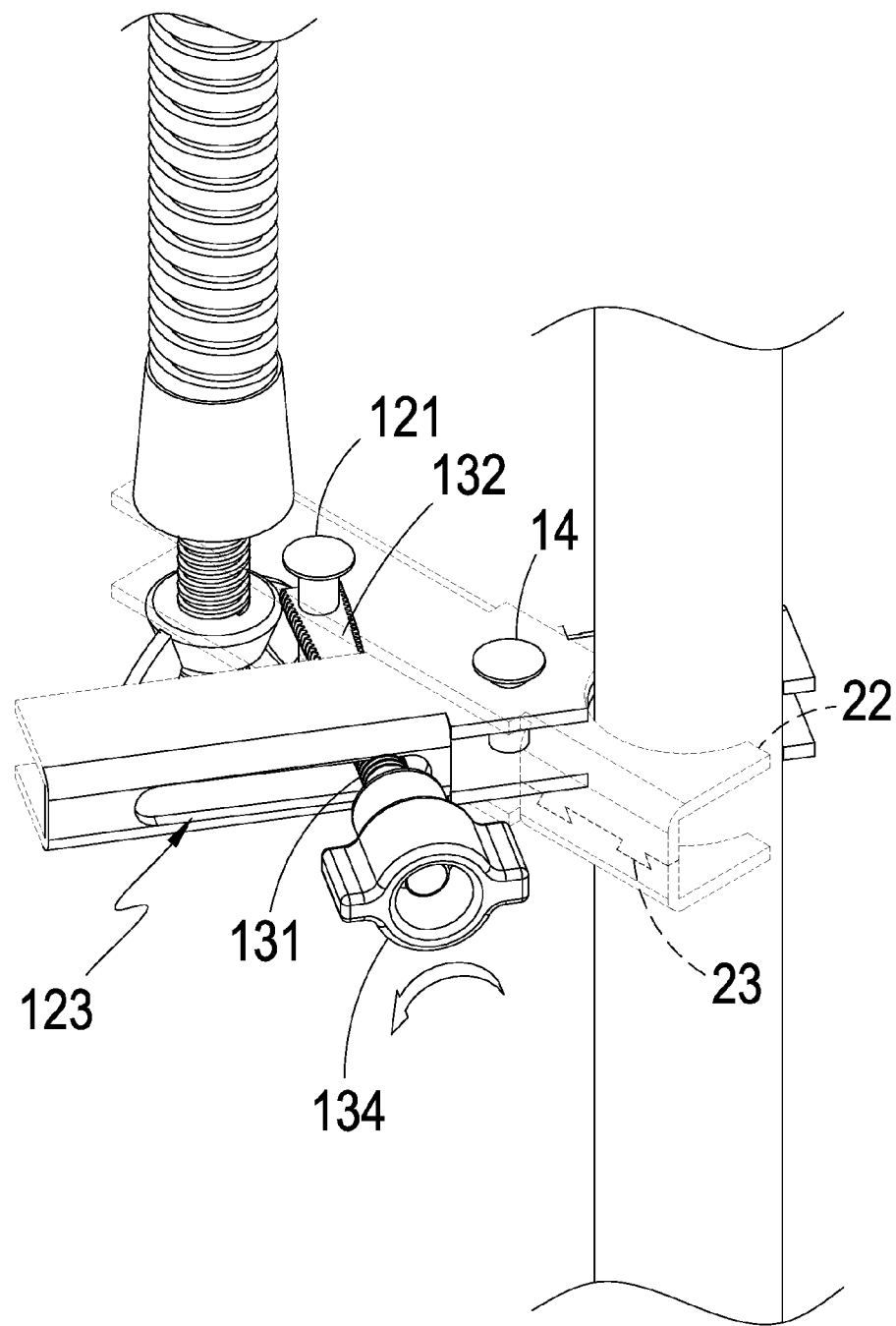
FIG. 6 is a schematic view illustrating a clamping operation of the clamp body according to the present invention.
Figure 7:
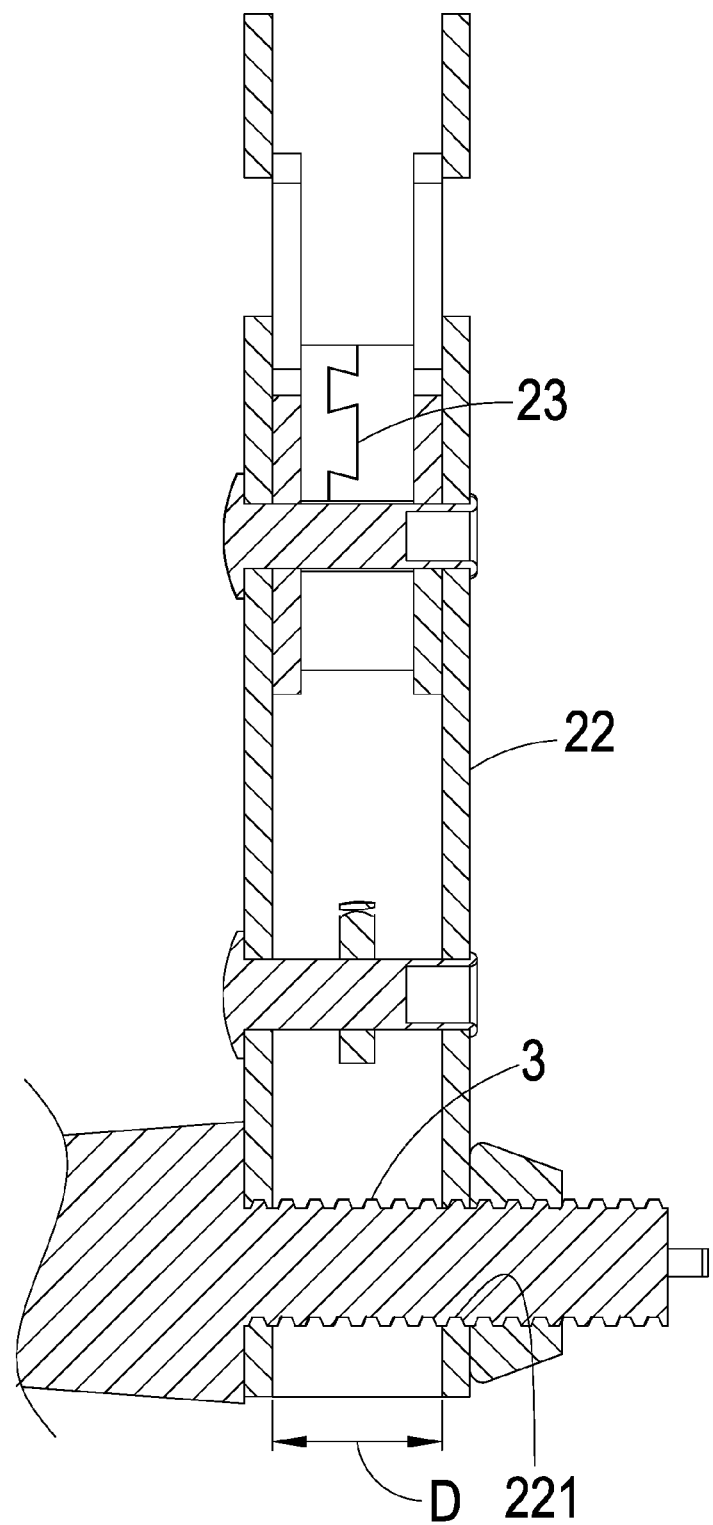
FIG. 7 is a cross-sectional view taken along line A-A of FIG. 1.
Figure 8:
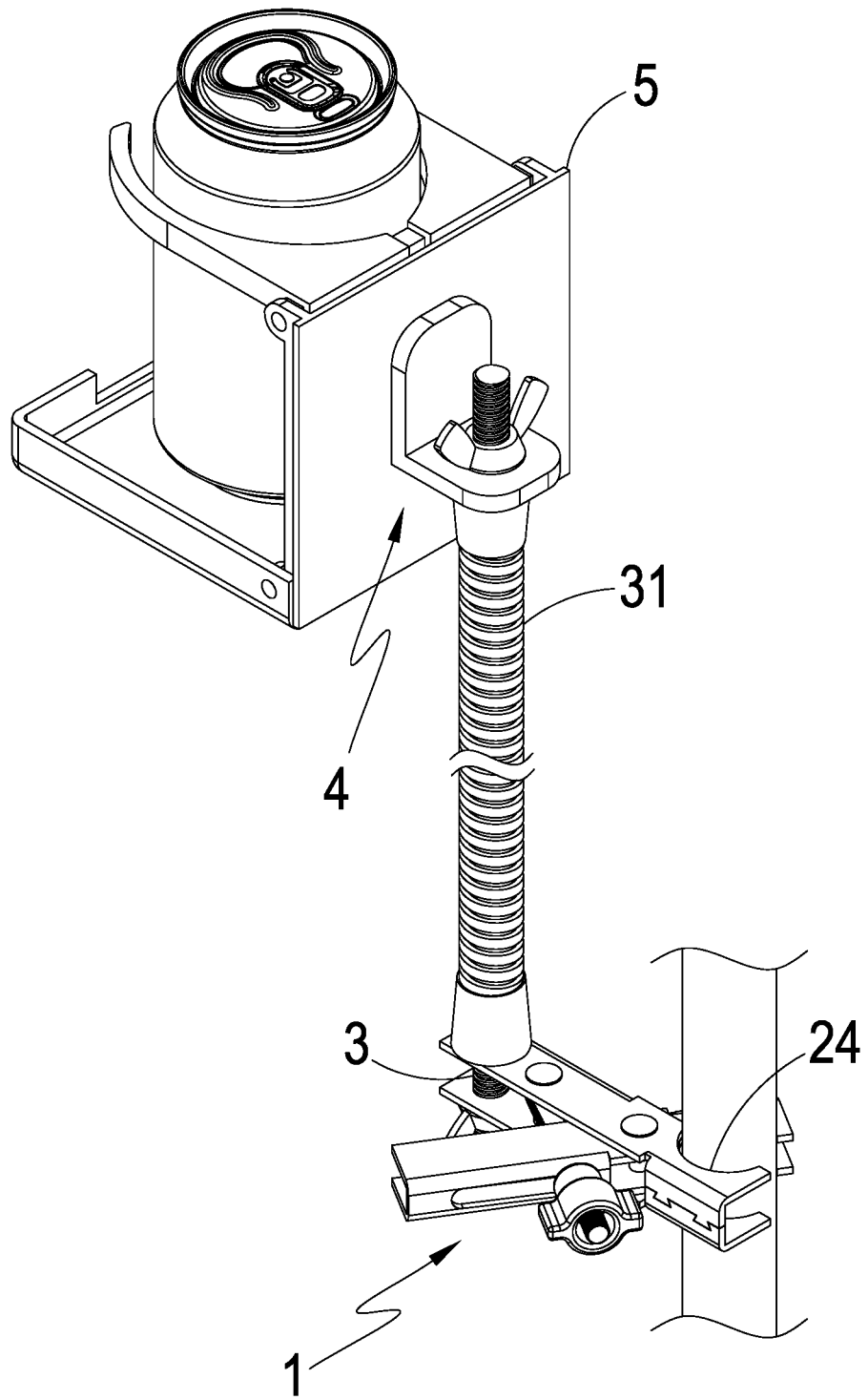
FIG. 8 is a perspective view showing a condition of use of the preferred embodiment of the present invention.

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Referring to FIGS. 1-5, the present invention comprises:

a clamp body 1, wherein the clamp body 1 comprises a first clamping member 11 and a second clamping member 12 that are mutually inserted into each other and rotatably coupled to each other;

a connection section 21 that is defined on the first clamping member 11 and a connection section 1221 that is defined on the second clamping member 12;

an elongate through hole 123 that is formed on the connection section 21 of the first clamping member 11;

two clamping sections 22 that are formed on and extending along opposite sides of the connection section 21 of the first clamping member 11;

two clamping sections 1222 that are formed on and extending along opposite sides of the connection section 1221 of the second clamping member 21;

at least one tenon section 23 that is respectively formed on the clamping sections 22 and 1222 for joining each other to strengthen the structural strength, wherein an end of the first clamping member 11 and the second clamping member 12 that is adjacent to the tenon section 23 is formed as a first end section 151 in the form of an inverted U-shape and an end of the first clamping member 11 or the second clamping member 12 that is distant from the first end section 151 is formed as a second end section 152 in the form of a U-shape such that the first and second clamping members 11, 12 are set in a form where two ends are U-shapes that are opposite to each other and the first and second clamping members 11, 12 are mutually extending through each other and rotatably coupled to each other to form an X-shape;

a clamping cutout section 24 that is respectively formed on an end of each of the clamping sections 22 and 1222 that is distant from the tenon section 23, where the clamping cutout section has a contour that is one of a rectangle, a circle, and en ellipse;

a position-constraining axle 121 that is arranged between the second clamping member 12 and the clamping sections 22 and 1222;

a pivotal axle section 14 that is arranged between the first clamping member 11 and the second clamping member 12, wherein the pivotal axle section 14 is located between the clamping cutout section 24 and the position-constraining axle 121 of the second clamping member 12 and corresponds, in position, to the first clamping member 11;

at least one tenon section 23 that is respectively formed on the clamping sections 22 and 1222 for joining each other to strengthen the structural strength;

a tightness adjustment assembly 13 that is movably arranged at one side of the first clamping member 11 and is operable to adjust tightness of the first clamping member 11 and the second clamping member 12, wherein the tightness adjustment assembly 13 comprises a threaded fastening member 131 penetrating through the elongate through hole 123, a flattened section 132 formed on the threaded fastening member 131, a through aperture section 133 formed on the flattened section 132 to receive the position-constraining axle 121 to penetrate therethrough, and a tightening member 134 screwed on the threaded fastening member 131 for fastening the first clamping member 11;

at least one position-constraining threaded hole 221 that is respectively formed on the two clamping sections 22 and 1222 for maintaining a spacing distance between the two clamping sections 22 and 1222 and increasing the structural strength of the clamp body 1;

a position-constraining screw 3 that is arranged on the clamp body 1 and corresponds to and couples with the position-constraining threaded hole 221, wherein the position-constraining screw 3 is wrapped, on an outer surface thereof, with a flexible supporting member 31; and a coupling assembly 4 that is formed at an end of the position-constraining screw 3 that is distant from the position-constraining threaded hole 221 for coupling with a member-to-be-held 5, wherein the coupling assembly 4 comprises a fixing seat 41, a direction adjusting member 42 arranged at one side of the fixing seat 41, and a positioning member 43 coupling the fixing seat 41 and the member-to-be-held 5 to each other; and the member-to-be-held 5 is provided, on one side thereof, with a position-constraining section 51 for constraining an operation of direction adjustment of the member-to-be-held 5.

As shown in FIGS. 1-8, the clamp body 1 of the present invention is mainly formed of the first clamping member 11 and the second clamping member 12 mutually extending through each other and rotatably coupled to each other to form an X-shape, wherein the two are each formed of a steel plate through stamping and bending. In the instant embodiment, the connection sections 21 and 1221 and the two clamping sections 22 and 1222 are bent to form each of the first and second clamping members 11, 12 of which two ends (the first end section 151 and the second end section 152) are U-shapes that are opposite to each other so that a clamping operation of the clamp body 1, when conducted in combination with the clamping cutout section 24, provides four supporting points (the first clamping member 11 providing two clamping sections 22 and the second clamping member 12 providing two clamping sections 1222) at the site of the clamping sections 22 and 1222 corresponding to the clamping cutout section 24 to therefore provide a more secured clamping effect, where the clamping cutout section 24 can be used to house a rectangular, circular, or elliptic tube or rod to prevent sliding frontward/rearward. Further, the end of each of the two clamping sections 22 and 1222 that is distant from the clamping cutout section 24 is provided with at least one tenon section 23. In making the clamp body 1 through bending, the tenon sections 23 are simultaneously bent toward each other to joint and thus be fixed to each other. In the instant embodiment, the tenon sections 23 are made in the form of a dovetailed configuration so that during an operation of clamping, a force that acts on the clamping cutout section 24 is taken by the tenon sections 23 so as to further improve joining strength between the two clamping sections 22 and 1222. With such a unique arrangement of the clamp body 1, difficulty of manufacturing can be reduced and at the same time, secureness of clamping, strength of clamping, and durability can all improved.

Further, the position-constraining screw 3 comprises a flexible supporting member 31 (wherein an end of the flexible supporting member 31 is provided with a threaded rod). When the position-constraining screw 3 is coupled to the clamp body 1, the position-constraining screw 3 is screwed into the position-constraining threaded hole 221 and fastening is achieved by using an element, such as a nut, so as to realize fixation. However, such an operation also provides an effect of fixing a spacing distance between the two clamping sections 22 and 1222 and increasing the structural strength of the clamp body 1. When the position-constraining threaded hole 221 is fastened, through a thread thereof, to the position-constraining screw 3, the corrugated pattern of the thread provides an effect of position constraint for the position-constraining screw 3 in upward and downward directions, so that even under a condition of being pressed or compressed by an external force, the spacing distance D can be kept fixed. Further, the position-constraining screw 3 helps strengthen a securely fixing effect of the clamping sections 22 and 1222 thereby improving structural strength of the clamping sections, making the clamping sections 22 and 1222 not readily deform due to an external force acting thereon.

To carry out an operation of clamping, the tightness adjustment assembly 13 is first released to allow the first clamping member 11 and the second clamping member 12 to rotate about a rotation center defined by the pivotal axle section 14 to adjust an opening width of the clamp body 1. Under this condition, since the threaded fastening member 131 is rotatably mounted, through the through aperture section 133 formed in the flattened section 132, to the position-constraining axle 121, the threaded fastening member 131 is allowed to swing or oscillate within the elongate through hole 123 of the first clamping member 11. The flattened section 132 is formed by applying a powerful external force to press and compress an end portion of the threaded fastening member 131, and then the through aperture section 133 is made through drilling conducted in the flattened section 132 to thereby form the unique configuration of the tightness adjustment assembly 13. Afterwards, screwing and setting the tightening member 134 would achieve easy adjustment the tightness and clamping force of the clamp body 1. Therefore, material selection and manufacturing of the tightness adjustment assembly 13 are also easy and simple and this, in combination with the arrangement of the tenon section 23, would allow for securely fixing through forcibly pressing or fastening by a user without the need for an external tool, nor concern about damaging the clamp body 1.

The coupling assembly 4 arranged at the end of the position-constraining screw 3 uses a positioning member 43 to fasten and fix the fixing seat 4 and the member-to-be-held 5 to each other. (In the instant embodiment, the positioning member 42 is a nut, the fixing seat 41 is of an L-shape, and the member-to-be-held 5 is a cup holder.) To provide a user with a function of angle adjustment, the direction adjusting 42 and the position-constraining section 51 provide mating engagement therebetween to allow a user to select a desired angular position and then fix. As such, the clamp body 1 can be attached, through clamping, to a tubular or rod-like object, and the flexible supporting member 31 and the coupling assembly 14 connect the member-to-be-held 5 to the clamp body 1, allowing the user to easily use it.

Figure 9:
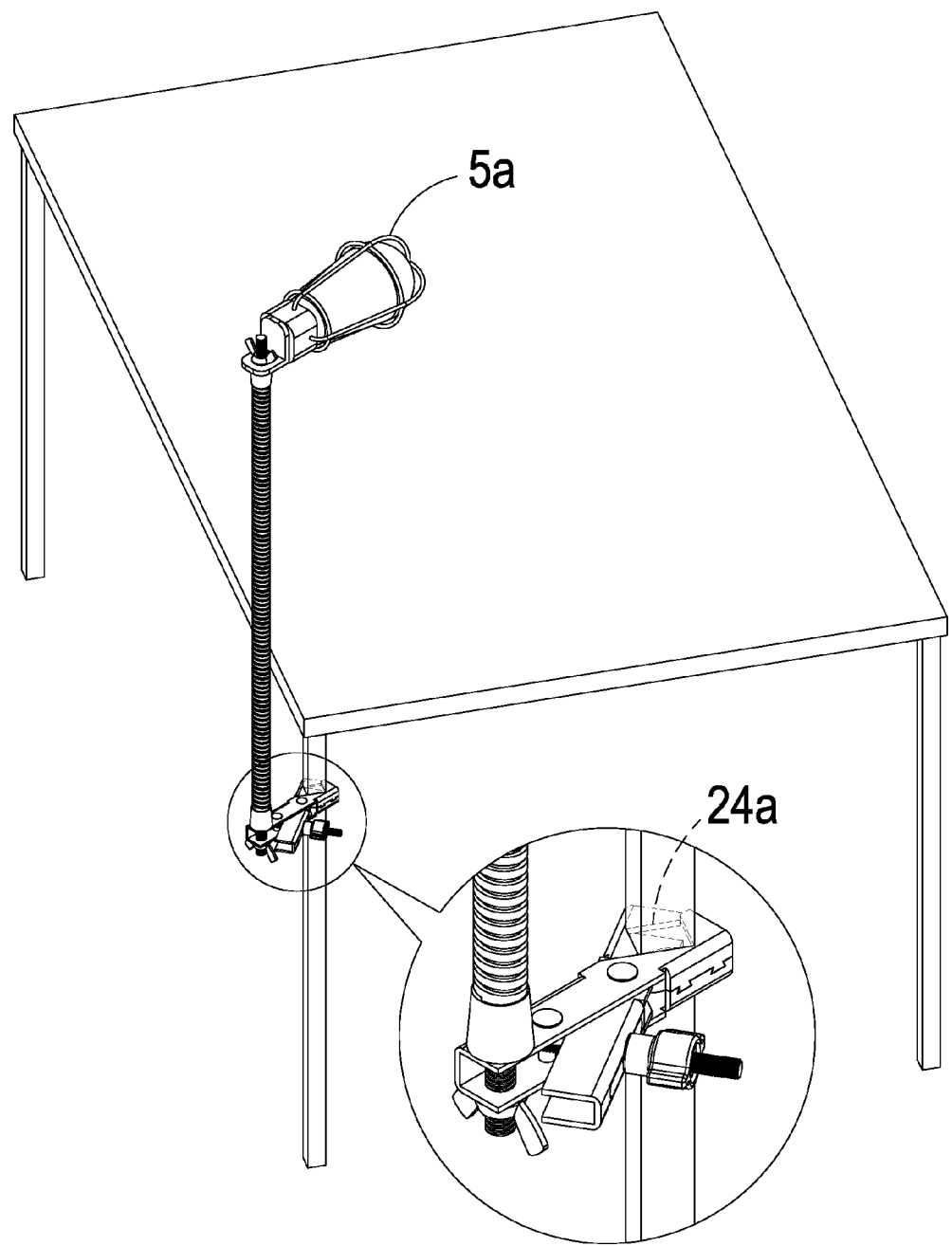
FIG. 9 is a perspective view showing a condition of use of another preferred embodiment of the present invention.

As shown in FIG. 9, in a different embodiment, the shape of the clamping cutout section 24a is changed from a semicircular shape for use in clamping a round tube to a triangular shape for clamping a square tube. Further, it is noted that the shape of the clamping cutout section 24a and the shape of the tube used in combination therewith are provided as examples of illustration of the present invention, and the present invention is not limited thereto. It is certain that the selection and exchange of the member-to-be-held 5a is made according to the need of the user, such as a working light included in this example, and thus, the present invention can be applied for an even wider range.

Figure 10:
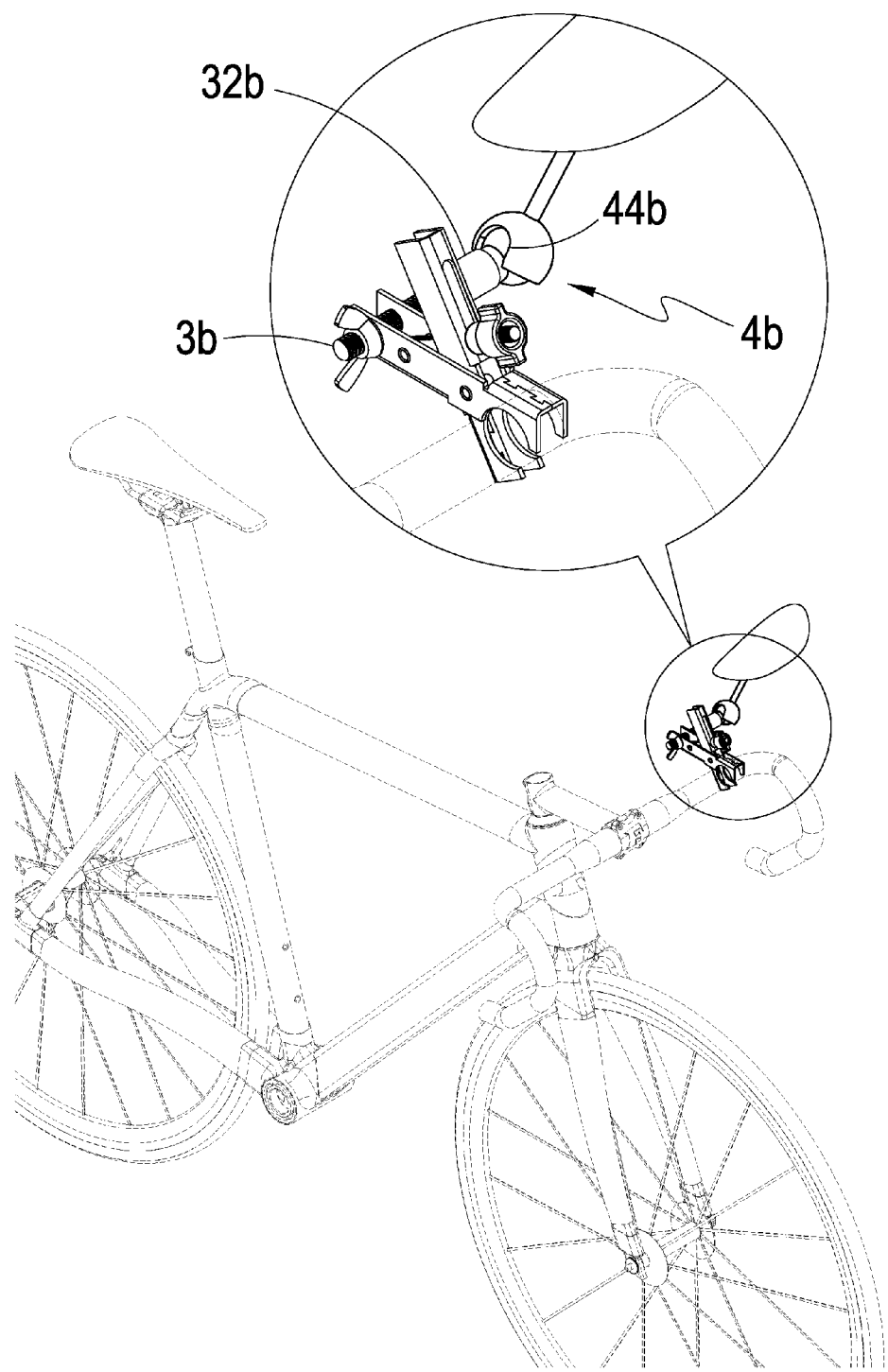
FIG. 10 is a perspective view showing a condition of use of a further preferred embodiment of the present invention.

As shown in FIG. 10, in a further embodiment of the present invention, a middle section of the position-constraining screw 3b is changed to a rigid reinforced tube 32b, and the coupling assembly 4b arranged at an end of the position-constraining screw 3b is changed to a universal spherical terminal 44b. This example is applicable to clamping to a bicycle handlebar, and the universal spherical terminal 44b provides the user with a measure for additionally mounting a rearview mirror or a mobile phone holder on the bicycle handlebar.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A fast tube-attachable frame, comprising:
   a clamp body, which is in a form of an X-shape, wherein the clamp body comprises a first clamping member and a second clamping member that are mutually extending through each other and rotatably coupled to each other;
   a connection section that is respectively defined on the first clamping member and the second clamping member;
   an elongate through hole that is formed on the connection section of the first clamping member;
   two clamping sections that are respectively formed on and extending along opposite sides of the connection section of the first clamping member;
   at least one tenon section that is respectively formed on the clamping sections for jointing to each other to strengthen a structural strength;
   each of the first clamping member and the second clamping member having a first end section that is adjacent to the tenon section and is formed as an inverted U-shape;
   each of the first clamping member and the second clamping member having a second end that is distant from the first end section and is formed as a U-shape such that two ends of the first and second clamping members are set in a form of U-shapes that are opposite to each other;

a clamping cutout section that is respectively formed on an end of each of the clamping sections that is distant from the tenon section, where the clamping cutout section has a contour that is one of a rectangle, a circle, and en ellipse;

a position-constraining axle that is arranged between the second clamping member and the clamping sections;

a pivotal axle section that is arranged between the first clamping member and the second clamping member, wherein the pivotal axle section is located between the clamping cutout section and the position-constraining axle of the second clamping member and corresponds, in position, to the first clamping member;

a tightness adjustment assembly that is movably arranged at one side of the first clamping member and is operable to adjust tightness of the first clamping member and the second clamping member, wherein the tightness adjustment assembly comprises a threaded fastening member penetrating through the elongate through hole, a flattened section formed on the threaded fastening member, a through aperture section formed on the flattened section to receive the position-constraining axle to penetrate therethrough, and a tightening member screwed on the threaded fastening member for fastening the first clamping member;

at least one position-constraining threaded hole that is respectively formed on the two clamping sections for maintaining a spacing distance between the two clamping sections and increasing a structural strength of the clamp body;

a position-constraining screw that is arranged on the clamp body and corresponds to and couples with the position-constraining threaded hole; and a coupling assembly that is formed at an end of the position-constraining screw that is distant from the position-constraining threaded hole for coupling with a member-to-be-held.

2. The fast tube-attachable frame according to claim 1, wherein the position-constraining screw comprises a flexible supporting member.

3. The fast tube-attachable frame according to claim 1, wherein the position-constraining screw comprises a reinforced tube.

4. The fast tube-attachable frame according to claim 1, wherein the coupling assembly comprises a fixing seat, a direction adjusting member arranged at one side of the fixing seat, and a positioning member coupling the fixing seat and the member-to-be-held to each other.

5. The fast tube-attachable frame according to claim 4, wherein the member-to-be-held is provided, on one side thereof, with a position-constraining section for constraining movement of the member-to-be-held and the direction adjusting member.

6. The fast tube-attachable frame according to claim 1, wherein the coupling assembly comprises a universal spherical terminal.

7. The fast tube-attachable frame according to claim 1, wherein the tenon section comprises one of dovetail tenon, slot tenon, and open tenon.

* * * * *